(12) United States Patent
Fitzpatrick et al.

(10) Patent No.: US 7,970,341 B2
(45) Date of Patent: Jun. 28, 2011

(54) SATELLITE LNB POWER SUPPLY ADAPTIVE LOAD

(75) Inventors: John James Fitzpatrick, Indianapolis, IN (US); Brian David Bajgrowicz, Marion, IN (US); Andrew Eric Bowyer, Indianapolis, IN (US); Jeffrey Owen Allender, Morristown, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 609 days.

(21) Appl. No.: 11/989,511

(22) PCT Filed: Dec. 14, 2005

(86) PCT No.: PCT/US2005/045258
§ 371 (c)(1),
(2), (4) Date: Jan. 25, 2008

(87) PCT Pub. No.: WO2007/070042
PCT Pub. Date: Jun. 21, 2007

(65) Prior Publication Data
US 2009/0125970 A1     May 14, 2009

Related U.S. Application Data

(60) Provisional application No. 60/703,155, filed on Jul. 28, 2005.

(51) Int. Cl.
*H04H 20/74* (2008.01)
(52) U.S. Cl. .............. 455/3.02; 455/3.04; 455/13.3; 455/430
(58) Field of Classification Search ........ 455/3.02–3.04, 455/427–430, 12.1, 13.3, 103, 107, 78; 725/68–72, 725/64, 78, 98
See application file for complete search history.

(56) References Cited

U.S. PATENT DOCUMENTS

| | | | |
|---|---|---|---|
| 4,542,300 A | | 9/1985 | Nagatomi et al. |
| 5,507,025 A | * | 4/1996 | Rodeffer .............. 455/266 |
| 5,861,855 A | * | 1/1999 | Arsenault et al. ......... 343/704 |
| 5,970,386 A | * | 10/1999 | Williams .............. 725/69 |
| 6,728,513 B1 | | 4/2004 | Nishima |

(Continued)

FOREIGN PATENT DOCUMENTS
GB        2280076        *    1/1995
(Continued)

OTHER PUBLICATIONS

Allegro Micorsystem Inc: "LNB Supply and Control Voltage Regulators" Data Sheet Allegro Microsystem, Jun. 30, 2003. pp. 1-14, XP002314515.

(Continued)

*Primary Examiner* — Sujatha Sharma
(74) *Attorney, Agent, or Firm* — Robert D. Shedd; Joseph J. Opalach; Kuniyuki Akiyama

(57) ABSTRACT

A method of processing an LNB power supply output signal comprising providing an LNB selection signal to select a first of the plurality of LNB signals as the input signal, superimposing a tone onto the LNB selection signal to select a second of the plurality of LNB signals as the input signal, providing a first transponder selection voltage to select a first set of transponders within the input signal, providing a second transponder selection voltage to select a second set of transponders within the input signal, and activating an adaptive load to preserve the tone if the second of the plurality of LNB signals is selected.

20 Claims, 5 Drawing Sheets

U.S. PATENT DOCUMENTS

| | | | |
|---|---|---|---|
| 6,832,071 B1 * | 12/2004 | Nakamura et al. | 455/3.02 |
| 6,996,389 B2 * | 2/2006 | Fitzpatrick et al. | 455/343.1 |
| 7,130,576 B1 * | 10/2006 | Gurantz et al. | 455/3.02 |
| 7,203,457 B1 * | 4/2007 | Wetzel | 455/3.02 |
| 7,207,054 B1 * | 4/2007 | Richards et al. | 725/72 |
| 2003/0129960 A1 | 7/2003 | Kato et al. | |
| 2005/0068704 A1 | 3/2005 | Kozaki | |
| 2008/0295137 A1 * | 11/2008 | Chen | 725/70 |

FOREIGN PATENT DOCUMENTS

| | | | |
|---|---|---|---|
| GB | 2300319 | * 10/1996 | |
| JP | 2001127661 | 5/2001 | |
| JP | 200123076 | 8/2001 | |
| JP | 2003204278 | 7/2003 | |
| JP | 2005102016 | 4/2005 | |

OTHER PUBLICATIONS

European Telecommunications Satellite Organization: Technical Recommandations for Manufacturers of DTH and SMATV Receiving Equipment—DiSEqC Version 4.0—Bus Functional Specification Citation. Mar. 22, 1996 XP002149629 the whole document.
Search Report Dated Mar. 16, 2006.

* cited by examiner

SATELLITE LNB POWER SUPPLY ADAPTIVE LOAD

This application claims the benefit under 35 U.S.C. §365 of International Application PCT/US2005/045258, filed Dec. 14, 2005, which was published in accordance with PCT article 21(2) on Jun. 21, 2007 in English and which claims the benefit under 35 U.S.C. §119 of a provisional application 60/703,155 filed in the United States on Jul. 28, 2005.

FIELD OF THE INVENTION

The present invention relates generally to satellite receivers and set top boxes in satellite systems. More specifically, the invention relates to a method and apparatus for providing an adaptive load for a satellite low noise block ("LNB") power supply.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the DirecTV satellite system, each "satellite" is actually a constellation of two closely spaced satellites. Each of these satellites comprise a number of transmitters, called transponders, each transponder of which transmits signals on a discrete RF frequency to earth-bound receivers. Each transponder's signal may be modulated with an audio/video program or with other data information. In order to optimize bandwidth utilization, the transponders on one satellite of a constellation transmit signals with right-hand circular polarization while the transponders of the other satellite of the constellation transmit signals with left-hand circular polarization. Satellite receiving systems contain one or more receiving antennae, each of which is switchable to receive either right-hand or left-hand polarized signals. These antennae are each associated with a low noise block (LNB) to amplify the signals received from a chosen set of transponders. The spectrum of RF signals received by each LNB is, in turn, processed by the receiver itself, where a specific frequency associated with a desired program channel is tuned and decoded.

Satellite receiver systems typically remotely power low noise blocks ("LNB") and/or RF switching devices by supplying a DC voltage. A 600 millivolt peak-to-peak, 22 kHz tone may be superimposed on the DC voltage to enable the receiver to communicate with such devices or to select various satellite configurations. For example, the presence or absence of the tone may select a particular LNB in a multi-LNB system, and the value of DC voltage supplied to the LNB may select a particular polarization.

Satellite receiver systems having LNB power supplies with the ability to superimpose a 22 kHz tone on the output are often configured with a linear pass element. The linear pass element typically has an emitter follower circuit that produces an undesired waveform when connected to a highly capacitive load. The resulting circuit acts like a peak detector causing the output voltage to stay at a value close to the maximum peak level. Essentially, such emitter follower circuits do not have the ability to remove charge from the external capacitance without the aid of some current sinking device.

Historically, satellite receiver systems specified a 30 ma minimum current on LNB/Switching devices and a maximum of 750 nF of capacitance on the output of the supply. Conventional designs have supplemented the minimum 30 ma current with a simple resistor in the satellite receiver power supply to provide enough current sink and produce a proper 22 kHz waveform shape. Satellite receiver systems are now moving toward a specification of zero load current at the LNB/Switch. This low load does not supply enough sinking current to produce a proper 22 kHz wave shape with the 750 nF load. Therefore, a method and apparatus that preserves a proper waveform in newer systems is desirable.

SUMMARY OF THE INVENTION

Certain aspects commensurate in the scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method to reduce slew rate distortions in a control system driving highly capacitive loads. Specifically, there is disclosed a method comprising providing a control signal to select between a first plurality of signals or a second plurality of signals, the control signal communicating the selection by a first DC level or a second DC level; and activating an adaptive load when the control signal transitions from the first DC level to the second DC level. In a further embodiment, the method also comprises the steps of superimposing a tone on the control signal, the tone signalling selection of a third plurality of signals; and activating the adaptive load when the tone is present.

A further embodiment is a system comprising a communication circuit adapted to provide a control signal to select between a first plurality of signals or a second plurality of signals, the control signal communicating the selection by a first DC level or a second DC level, and an adaptive load configured to supply a load current when the control signal transitions from the first DC level to the second DC level. The system may also comprise a tone superimposed on the control signal, and wherein the adaptive load is activated when the tone is present.

Yet another embodiment is a control apparatus comprising means for providing a control signal to select between a first plurality of signals or a second plurality of signals, the control signal communicating the selection by a first DC level or a second DC level and means for supplying a load current when the control signal transitions from the first DC level to the second DC level. The control apparatus may further comprise means for superimposing a tone on the control signal, wherein the means for supplying a load current (40) is activated when the tone is present.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation specific decisions must be made to achieve the developer's specific goals, such as compliance with system related and business related constraints which may vary from one implementation to another. Moreover, it should be appreciated that such a development effort might be complex and time consuming, but would nevertheless be a routine undertaking of design fabrication and manufacture for those of ordinary skill having the benefit of this disclosure.

Figure 1:
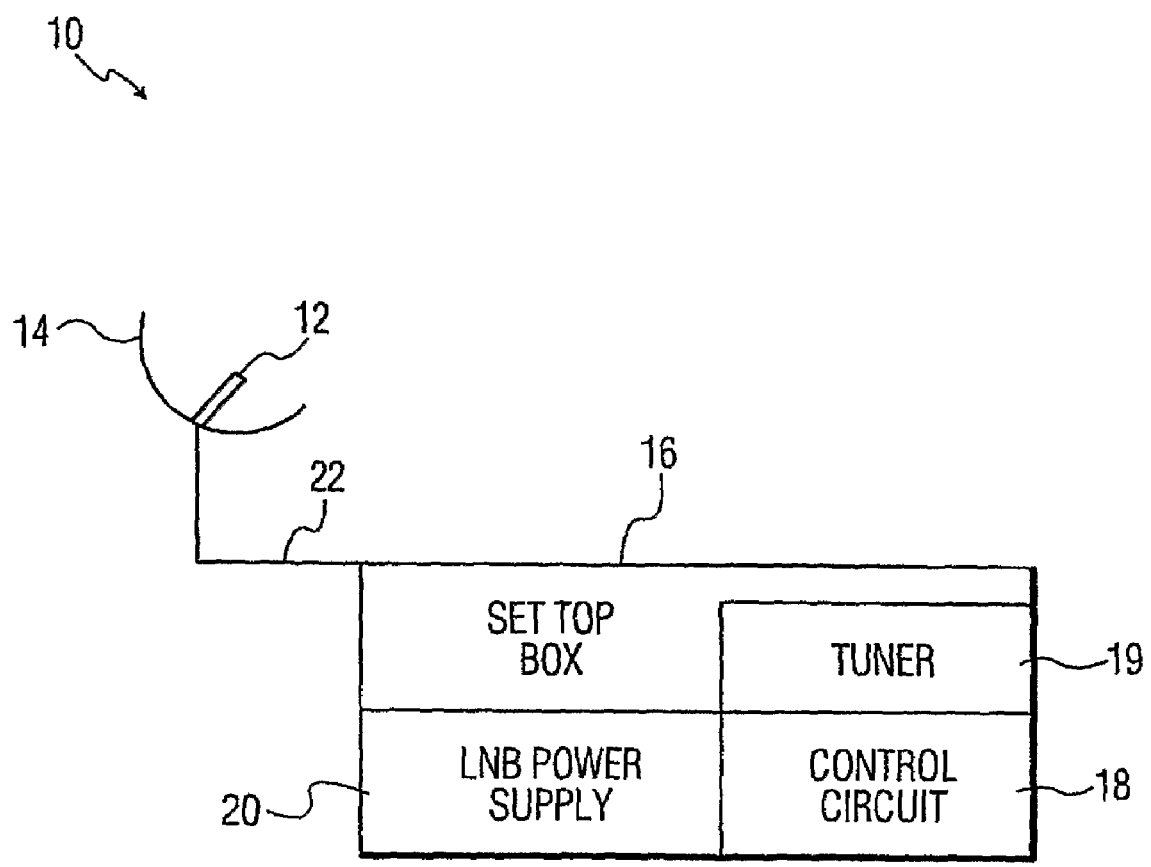
FIG. 1 is an exemplary satellite receiver system in accordance with one embodiment of the present invention.

Turning initially to FIG. 1, an exemplary satellite receiver system in accordance with one embodiment of the present invention is shown and generally designated by the reference numeral 10. Specifically, FIG. 1 shows an LNB unit 12 located inside a satellite dish 14. The LNB unit 12 may comprise one or more LNBs. Each LNB may be configured to receive the signal of a different constellation of satellites. Each LNB of the LNB unit 12 is electrically coupled with a set top box 16. The set top box 16 is shown having an LNB power supply 20, a control circuit 18 and a tuner 19.

The set top box 16 is configured to communicate with the LNB using "High" and "Low" voltage signals in combination with the presence or absence of a 22 kHz tone. For example, the set top box 16 may cause the LNB power supply 20 to superimpose a 22 kHz tone on an output voltage from the LNB power supply 20. The presence or absence of the tone indicates which LNB 12 has been selected, and thus which constellation of satellite signals will be received.

The output voltage level of the LNB power supply 20 indicates the selection of polarization. For example, the set top box 16 via the LNB power supply 20 may supply a high output voltage, such as 18 volts, or a low output voltage, such as 13 volts, to indicate to the LNB to tune a signal having a particular polarization. In an exemplary embodiment of the present invention, the polarization may be either right- or left-handed circular polarization. Alternative embodiments of the invention may employ horizontal and vertical polarization or the like. The use of polarization allows selection of an input signal from different sets of transponders on a particular satellite constellation. The signal received from each transponder may comprise unique information such as different channels of audio and video programming. In an exemplary embodiment, a "high" voltage level of 18 volts selects data received from a first set of transponders while a "low" signal of 13 volts selects data received from a second set of transponders.

Additionally, the set top box 16 may be configured to communicate with the LNB according to a DiSEqC standard. The DiSEqC standard recognizes the utilization of various voltage levels as well as the tones. In the DiSEqC scheme, pulse width keying of the tones is implemented in order to facilitate communication between the LNB and the set top box.

The satellite set top box industry requires proper tone shape at all specified load conditions. Load conditions typically range from 0 to 450 ma and are at times required to drive capacitive loads up to 750 nF. 50 ma of load is desirable to provide the proper waveform shape of an LNB power supply driving a max-specified 750 nF capacitive load. As the LNB power supply operates in both the 13 volt and 18 volt modes, the current sink must be adaptable to sink 50 ma in both modes.

A control circuit 18 may be adapted to provide control signals to the LNB power supply 20. The control signals from the control circuit enable or disable the adaptive load to sink 50 ma of current and preserve the waveform shape of a 22 kHz tone when driving highly capacitive loads with little or no additional current load.

Figure 2:
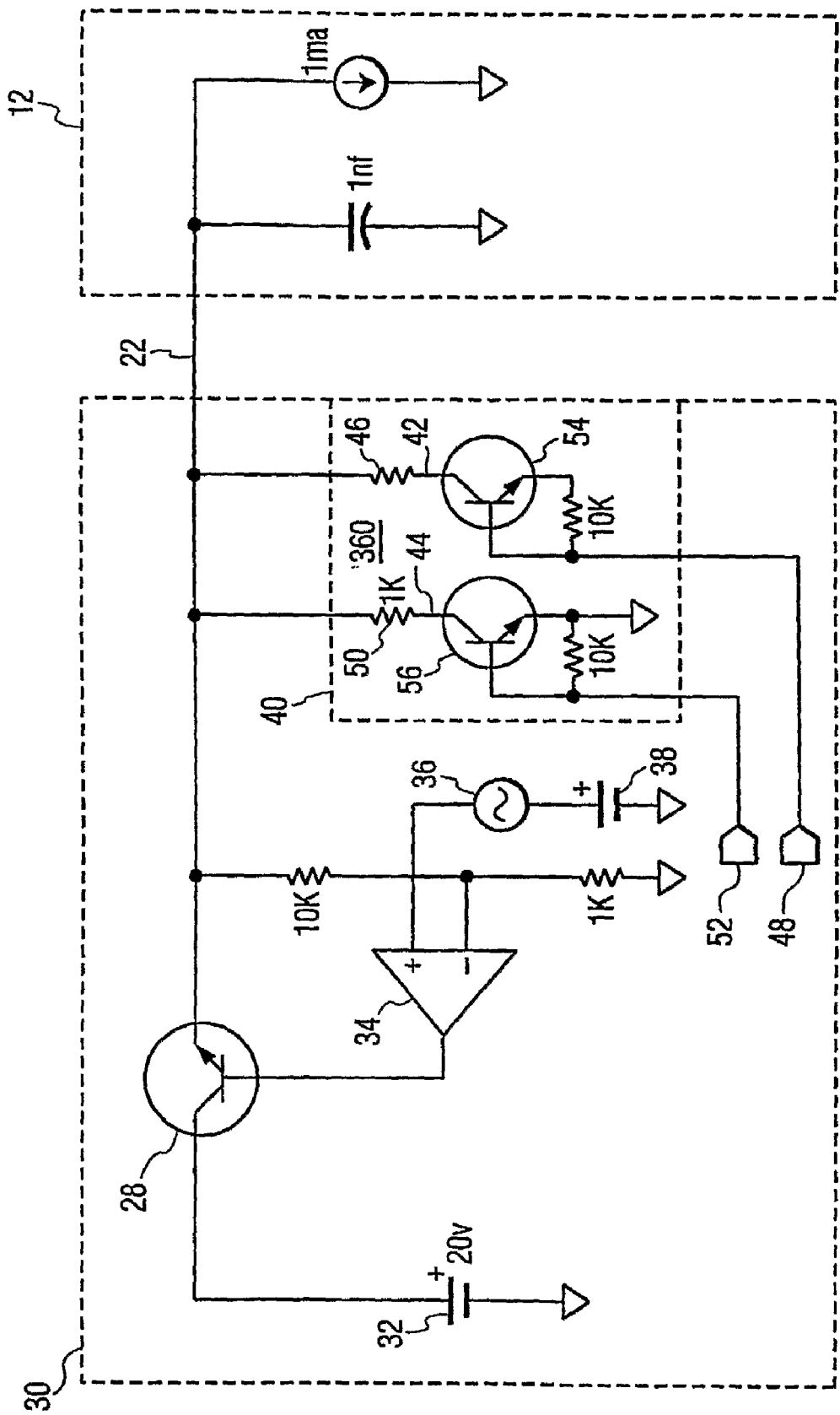
FIG. 2 is an exemplary LNB power supply with an adaptive load for a satellite receiver in accordance with one embodiment of the present invention.

FIG. 2 shows an exemplary LNB power supply with an adaptive load for a satellite receiver in accordance with one embodiment of the present invention and is generally designated by the reference numeral 30. Specifically, FIG. 2 shows a power transistor 28 configured as an emitter follower circuit. A DC source 38 provides the high or low output voltage level discussed previously to facilitate transponder selection. Additionally, the 22 kHz tone may be superimposed by an AC source 36, depending on which LNB is required to satisfy the viewing channel to be selected by a user. The high or low output voltage with or without the 22 kHz tone superimposed is delivered to an operational amplifier 34 to the base of the power transistor 28. The emitter of the power transistor 28 is connected to the bus 22 between the set top box 16 and the LNB unit 12.

In an exemplary embodiment of the present invention, an adaptive load 40 is electrically coupled to the bus 22. The adaptive load 40 acts as a current sink to discharge excess charge and ensure a proper 22 kHz tone waveform. The adaptive load comprises a high current segment 42 and a low current segment 44. The high current segment 42 is enabled by a high current adaptive load signal 48. When a 22 kHz tone is superimposed on an 18 volt signal, the high current signal from the control circuit 18 enables the high current segment 42. The high current segment 42 draws 50 ma through a 360 ohm resistor 46 when enabled while an 18 volt signal is present.

The low current segment 44 is enabled by a low current adaptive load signal 52 from the control circuit 18. The low current adaptive load signal enables the low current segment 44 when a 22 kHz tone is superimposed on a 13 volt signal. The low current segment 44 draws 13 ma through a 1 K ohm resistor 50. The high current segment 42 is also enabled while a 22 kHz tone is superimposed on a 13 volt signal and draws 36 ma. Together, the high and low current segments can draw 49 ma.

In the illustrated embodiment, the adaptive load is made up of two bipolar transistor switched resistive loads 46 and 50. The "high" load 42 provides 50 ma in the 18 volt mode and 36 ma when in the 13 volt mode. The "low" load 44 only operates in the 13 volt mode and provides 13 ma of current when active. The additional 13 ma of current brings the total adaptive load current to 49 ma in the 13 volt mode. A high current adaptive load control signal 48 is used to activate the "high" load 42. The low current adaptive load control signal 52 is used to activate the "low" load 44.

Figure 3:
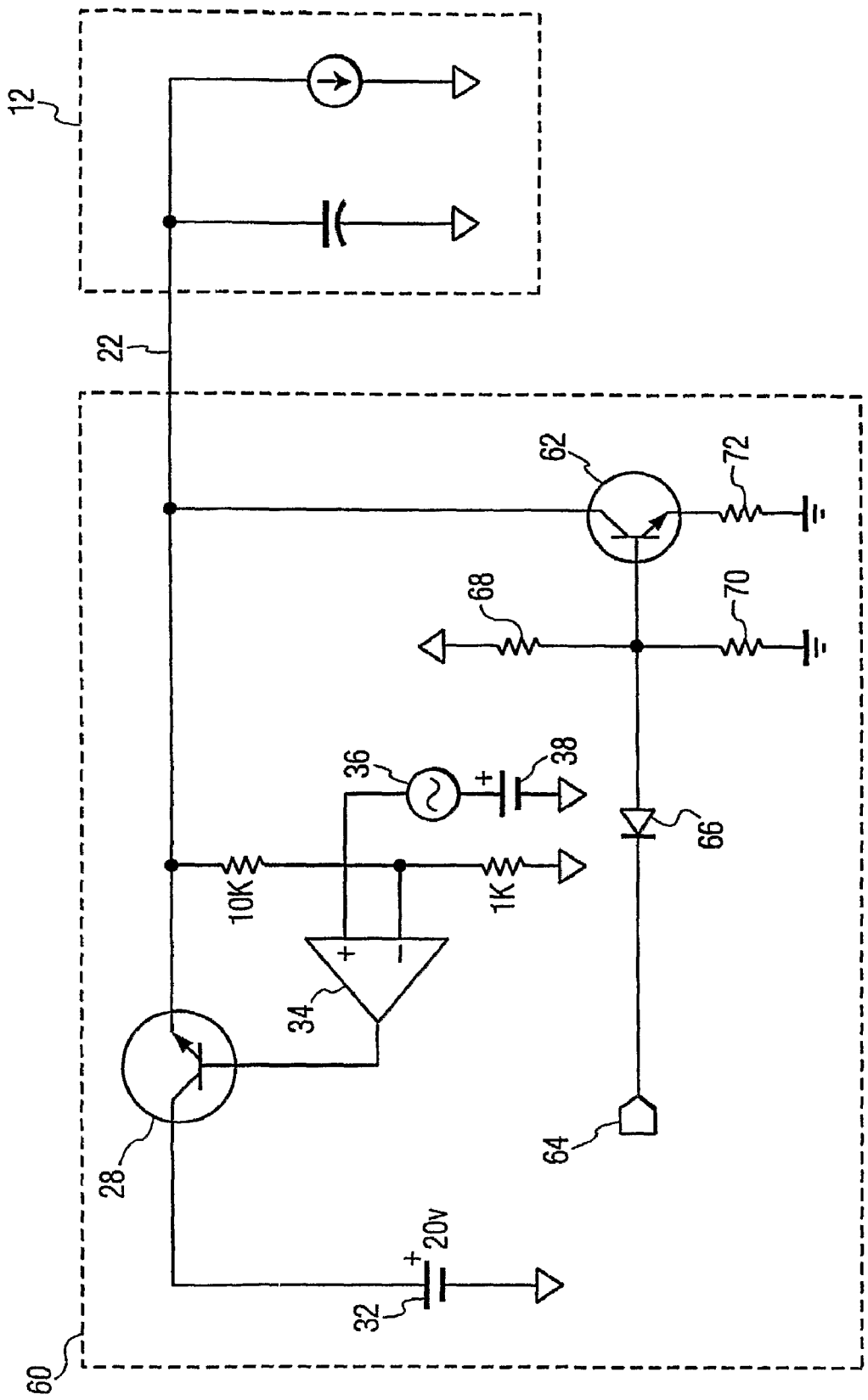
FIG. 3 is an exemplary LNB power supply with an independent current source for a satellite receiver in accordance with one embodiment of the present invention.

FIG. 3 is an exemplary power supply with an independent current source for a satellite receiver in accordance with one embodiment of the present invention and is generally designated by the reference numeral 60. The power supply 60 is different from the power supply 30 of FIG. 2 in that it implements a single current source. Also, the current source of power supply 60 is independent from the bus voltage, whereas in the power source 30 of FIG. 2, the current drawn through the two load resistors 46 and 50 is a function of the bus voltage. In the power source 60 of FIG. 3 when the transistor 62 is "on" a constant current of 50 ma is drawn through the current sink independent of the bus voltage.

The adaptively controlled loads described above provide cost-effective solutions to preserve the 22 kHz tone while minimizing the additional current required by the LNB power supply and result in overall power savings to the system. In addition to helping ensure a proper waveform of the 22 kHz tone, the system is capable of reducing channel change time. Delays associated with long "high output voltage" to "low output voltage" transition times contribute to the time it takes to switch polarization control voltage and relock the tuner 19. Satellite receiver decoders potentially require different polarization selection when transitioning from one display channel to another. In the case of polarization changes, the voltage supplied from the LNB power supply will change from "high output voltage" to "low output voltage" or vice versa. When the LNB power supply is transitioning from "high output voltage" to "low output voltage" the transition can take a substantial amount of time delaying the time it takes the LNB to switch polarization. This adaptive load method helps assure proper high to low output voltage transitions by applying the 50 ma load to discharge parasitic capacitance in the circuit.

Figure 4:
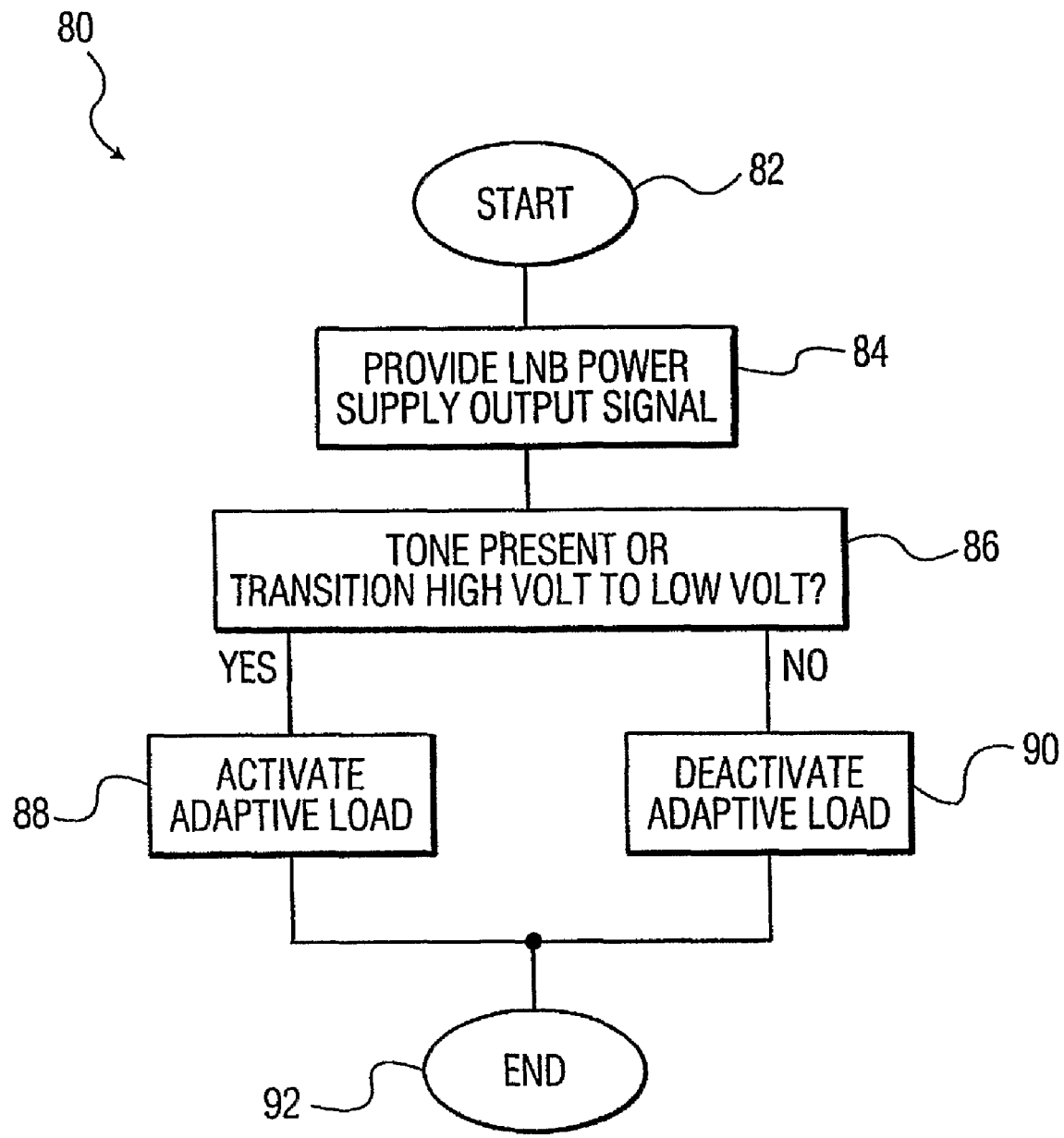
FIG. 4 is a flow chart illustrating an exemplary technique in accordance with one embodiment of the present invention.

Turning to FIG. 4, a flow chart illustrating an exemplary technique in accordance with one embodiment of the present invention is shown and generally designated by the reference numeral 80. The exemplary technique 80 begins at block 82 with the initialization of a satellite receiver. Upon initialization of the receiver, an LNB power supply outputs a signal, as shown at block 84. As discussed earlier, the signal is used for communication between the set top box 16 (FIG. 1) and an LNB unit 12 (FIG. 1). The signal may comprise multiple voltage levels as well as a superimposed 22 kHz selection tone that may be modulated. As shown at block 86, if the selection tone is present or if there is a transition from a high voltage level to a low voltage level (for example from 18 volts to 13 volts), the adaptive load is activated, as shown at block 88. If no tone is present and there is no transition from high to low voltage, the adaptive load is deactivated because it is not needed, as illustrated at block 90. The technique 80, therefore, provides a method for preserving the tone waveform and potentially increases channel changing speed in the system. At block 92, the exemplary process ends.

The technique 80 may result in decreased power consumption, thus providing an additional benefit. Increased industry pressure to provide power savings militates in favor of a load that is capable of being reduced or turned off when no tone is required or when in standby mode. In one exemplary embodiment, the current sink is capable of being turned off when it is not needed, for example, when there is no 22 kHz tone. In an alternative embodiment, the current sink is dependent on the bus from the power supply to the LNB, as explained in detail above. If there is no current on the bus, such as in a turned off state, there is no current drawn to the current sink.

Figure 5:
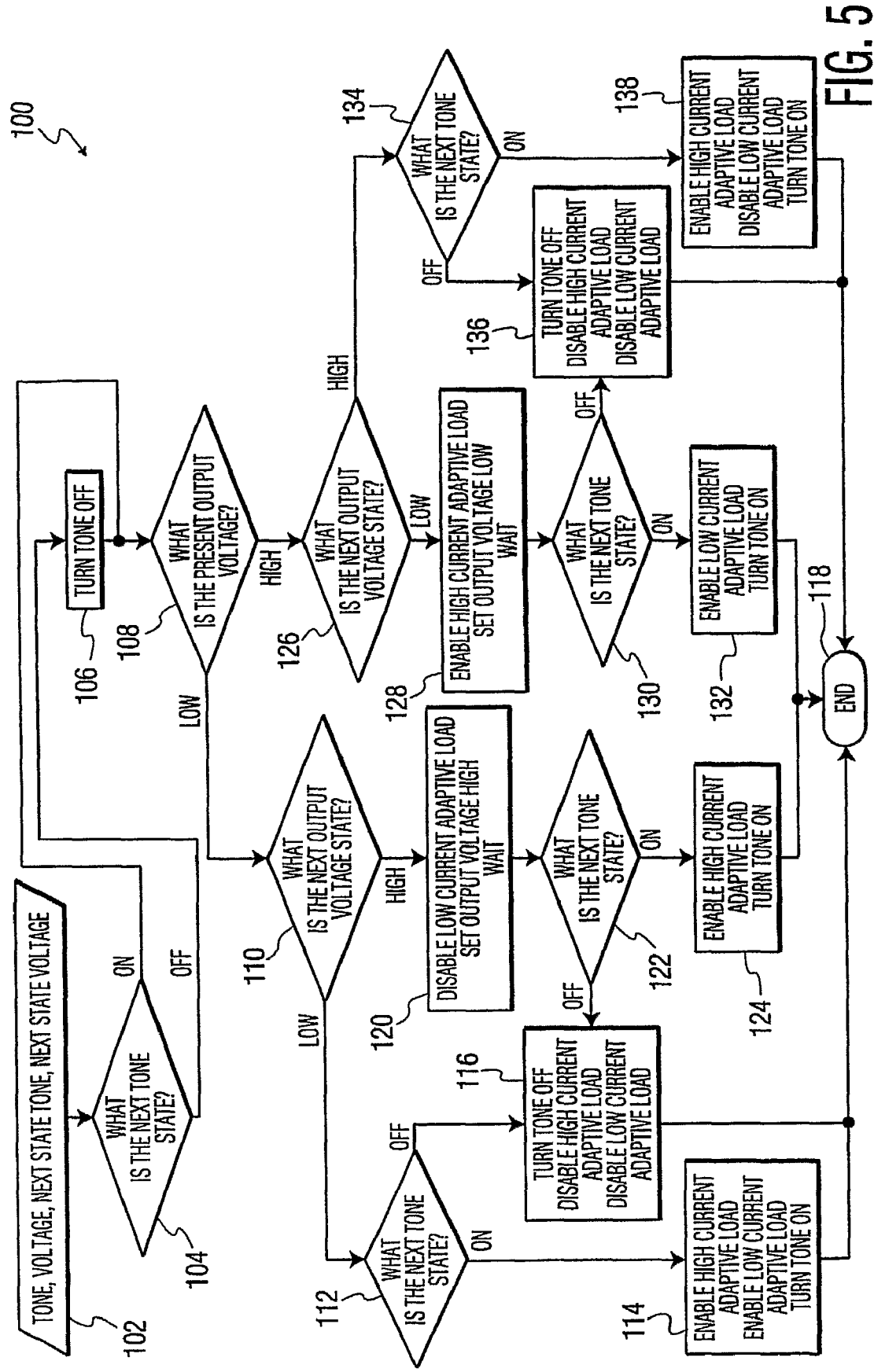
FIG. 5 is a flow chart illustrating an exemplary technique in accordance with an alternative embodiment of the present invention.

FIG. 5 is a flow chart illustrating an exemplary technique in accordance with an alternative embodiment of the present invention and is generally designated by the reference numeral 100. The exemplary embodiment illustrated in FIG. 5 may be implement by the control circuit 18 (FIG. 1) to take into account present tone, next tone, present voltage and next voltage conditions to determine the application of an adaptive load. The technique 100 accomplishes control of the two switched loads that make up the adaptive load and provides the advantages described above.

As illustrated in FIG. 5, the process begins at block 102. At decision block 104, an initial determination is made regarding whether the next state of the tone is on or off. If the tone is off in the next state, then the tone will be turned off, as indicated at block 106. If, alternatively, the next tone state is on, process flow continues to decision block 108, where the present output voltage (low or high) is determined. If the present output voltage is low, the next output voltage state is determined, as illustrated at block 110. If the system is to remain in a low output voltage state, the next tone state (on or off), is determined at decision block 112.

If both the present output voltage (block 108) and the next output voltage states (block 110) are low and the next tone state is on, then both the high current adaptive load and the low current adaptive load are enabled and the tone is turned on, as illustrated at block 114. If, however, the next tone state is off (block 112), then the tone is turned off and both the high current adaptive load and the low current adaptive load are disabled, as indicated at block 116.

Returning to decision block 110, where the present output voltage is low (block 108), if the next output voltage state is high (block 110), the low current adaptive load is disabled and the output voltage is set to high, as illustrated at block 120. From block 120, process flow continues to decision block 122, where the next tone state is determined. If the next tone state is off, the tone is turned off, and both the high current adaptive load and low current adaptive load are disabled, as indicated at block 116. If, however, the next tone state is on at block 122, the high current adaptive load is enabled prior to turning the tone on, as indicated at block 124.

Returning to block 108, where the present output voltage is determined, if the present output voltage is determined to be high, the next output voltage state is determined at block 126. If the next output voltage is low at block 126, only the high current adaptive load is enabled and the output voltage is set to low, as illustrated at block 128. Process flow then continues to block 130, where the next tone state is determined. If in next state the tone is on, the low current adaptive load is enabled prior to turning the tone on, as illustrated at block 132. If, alternatively, the next tone state is off at block 130, the tone is turned off and both the high current adaptive load and the low current adaptive load are disabled, as shown at block 136.

Returning to block 108, if the system is presently in a high output voltage state and the next output voltage state is also a high voltage state (block 126), then the next tone state is determined at block 134. If the next tone state is off, the tone is turned off and both the high current adaptive load and the low current adaptive load are disabled, as indicated at block 136. If, alternatively, the next tone state is determined to be on at block 134, the high current adaptive load is enabled while the low current adaptive load is disabled prior to the tone being turned on, as indicated at block 138. At block 118, process flow ends.

The following is a listing of exemplary psuedocode in accordance with one embodiment of the present invention:

Variables
Adaptive_Load_Low, Adaptive_Load_High, Next_State_Tone, Next_State_Voltage, Tone, Voltage
If Next_State_Tone = Off then

```
            Tone = Off
            Process_Level
        Else
            Process_Level
        Endif
    Function (Process_Level)
    If Voltage = High then                      //Voltage = High
        If Next_State_Voltage = Low then        //High to Low transition
                                                  14, 9, 10, 13
            Adaptive_Load_High = On
            Voltage = Low
            Wait
            If Next_State_Tone = On then        //10, 14 Tone on or
                                                   turning on
                Adaptive_Load_High = On
                Adaptive_Load_Low = On
                Tone = On
            Else                                //13, 9 Tone off or
                                                   turning off
                Tone = Off
                Adaptive_Load_High = Off
                Adaptive_Load_Low = Off
            Endif
        Else                                    //Vout High & Stays High
                                                  12, 15, 11, 16
            If Next_State_Tone = On then        //12, 16 Tone on or
                                                   turning on
                Adaptive_Load_High = On
                Adaptive_Load_Low = Off
                Tone = On
            Else                                //15, 11 Tone off or
                                                   turning off
                Tone = Off
                Adaptive_Load_High = Off
                Adaptive_Load_Low = Off
            Endif
        Endif
    Else                                        //Voltage = Low
        If Next_State_Voltage = High then       //Low to High transition
                                                  8, 3, 4, 7
            Adaptive_Load_Low = Off
            Voltage = High
            Wait
            If Next_State_Tone = On then        //8, 4 Tone on or
                                                   turning on
                Adaptive_Load_High = On
                Adaptive_Load_Low = Off
                Tone = On
            Else                                //3, 7 Tone off or
                                                   turning off
                Tone = Off
                Adaptive_Load_High = Off
                Adaptive_Load_Low = Off
            Endif
        Else                                    //Vout Low & Stays Low
                                                  2, 5, 1, 6
            If Next_State_Tone = On then        //2, 6 Tone on or turning
                                                   on
                Adaptive_Load_High = On
                Adaptive_Load_Low = On
                Tone = On
            Else                                //5, 1 Tone off or
                                                   turning off
                Tone = Off
                Adaptive_Load_High = Off
                Adaptive_Load_Low = Off
            Endif
        Endif
    Endif
Endif
```

While the invention may be susceptible to various modifications and alternative forms, specific embodiments have been shown by way of example in the drawings and described in detail herein. However, it should be understood that the invention is not intended to be limited to the particular forms disclosed, rather the invention is to cover all modifications, equivalents and alternatives falling within the spirit and scope of the invention as defined by the following appended claims.

We claim:

1. A method, comprising:
   providing a control signal to select between a first plurality of signals or a second plurality of signals, said control signal communicating said selection by a first DC level or a second DC level; and
   activating an adaptive load when said control signal transitions from said first DC level to said second DC level.

2. The method according to claim 1 further comprising the steps of:
   superimposing a tone on said control signal, said tone signaling selection of a third plurality of signals; and
   activating said adaptive load when said tone is present.

3. The method according to claim 2, wherein activating said adaptive load comprises activating a high current adaptive load if said first DC level and said tone are both present.

4. The method according to claim 2, wherein activating said adaptive load comprises activating a high current adaptive load and a low current adaptive load when said second DC level and said tone are both present.

5. The method according to claim 2, wherein said adaptive load is enabled independently of which of said first DC level and said second DC level is enabled.

6. The method of claim 1, wherein said adaptive load is disabled when in a standby mode.

7. The method according to claim 1, wherein activating said adaptive load comprises activating a high current adaptive load.

8. The method according to claim 1, wherein said adaptive load comprises a constant current source.

9. A system, comprising:
   a communication circuit adapted to provide a control signal to select between a first plurality of signals or a second plurality of signals, said control signal communicating said selection by exhibiting a first DC level or a second DC level; and
   an adaptive load configured to supply a load current when said control signal transitions from said first DC level to said second DC level.

10. A system according to claim 9, wherein said communication circuit 3 further provides a tone superimposed on said control signal, and wherein said adaptive load is activated when said tone is present.

11. The system according to claim 10, wherein activating said adaptive load comprises activating a high current adaptive load if said first DC level and said tone are both present.

12. The system according to claim 10, wherein activating said adaptive load comprises activating a high current adaptive load and a low current adaptive load when said second DC level and said tone are both present.

13. The system according to claim 10, wherein said adaptive load is enabled independently of which of said first DC level and said second DC level is enabled.

14. The system of claim 9, wherein said adaptive load is disabled when in a standby mode.

15. The system according to claim 9, wherein activating said adaptive load comprises activating a high current adaptive load.

16. The system according to claim 9, wherein said adaptive load comprises a constant current source.

17. A control apparatus, comprising:
means for providing a control signal to select between a first plurality of signals or a second plurality of signals, said control signal communicating said selection by exhibiting a first DC level or a second DC level; and
means for supplying a load current when said control signal transitions from said first DC level to said second DC level.

18. The control apparatus according to claim 17, further comprising means for superimposing a tone on said control signal, wherein said means for supplying a load current is activated when said tone is present.

19. The control apparatus according to claim 18 wherein said means for supplying a load current is a constant current source.

20. The control apparatus according to claim 17 wherein said means for supplying a load current is a constant current source.

* * * * *